April 15, 1958 R. A. FISCHER ET AL 2,830,521
CABIN PRESSURE OUTFLOW VALVE
Filed March 1, 1955
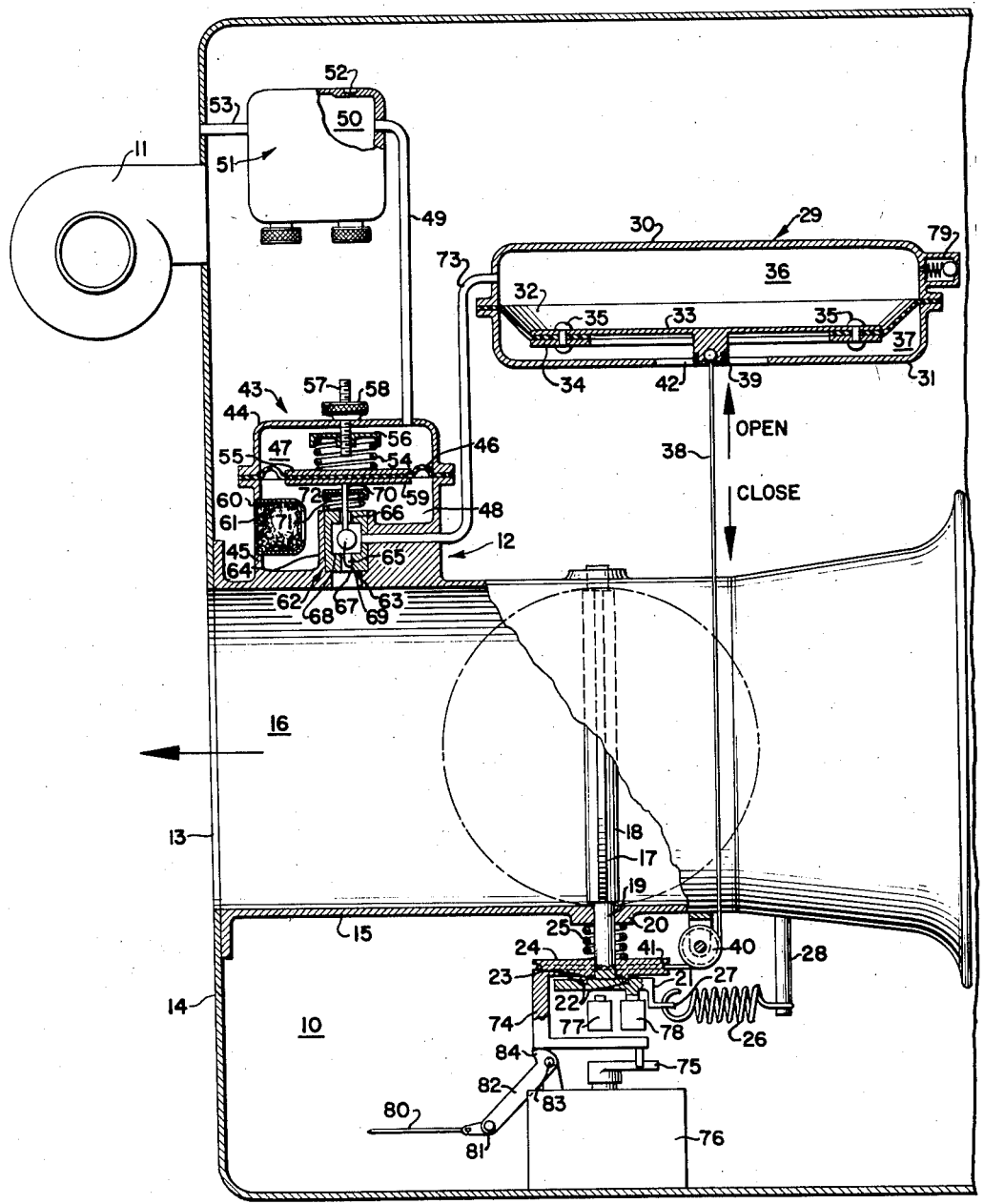
RICHARD A. FISCHER,
LLOYD F. MAULDIN,
INVENTORS.
BY John H.T. Wallace United States Patent Office 2,830,521
Patented Apr. 15, 1958

2,830,521

CABIN PRESSURE OUTFLOW VALVE

Richard A. Fischer and Lloyd F. Mauldin, Los Angeles, Calif., assignors to The Garrett Corporation, Los Angeles, Calif., a corporation of California Application March 1, 1955, Serial No. 491,448

4 Claims. (Cl. 98—1.5)

This invention relates generally to pressure regulating or control means and relates more particularly to means or mechanism for controlling the pressure in an enclosure.

While the invention has particular utility in connection with pressurized ventilation of enclosures, such as aircraft cabins and the like, and is hereinafter shown and described as embodied in such an installation, it is to be understood that its utility is not limited thereto. It is to be further understood that the term "aircraft" as used herein, refers to any type of vehicle or device that travels within the earth's atmosphere or above it.

Generally, in cabin pressurizing and ventilating systems, an air pump, supercharger or the like is provided for continuously supplying air under pressure to the cabin, and the air pressure within the cabin is maintained at the required pressure by controlling the flow of air from the cabin through one or more outflow valves disposed in an opening or openings in the wall of the enclosure. In such a system the control pressure chamber of the outflow valve is connected to the control pressure chamber of a pressure control setting mechanism and the outflow valve is modulated in accordance with the controlled pressure to maintain enclose pressure at the predetermined set value.

When an outflow valve capable of handling a large flow of air is used to maintain the pressure in a cabin in accordance with the setting of the pressure control mechanism, the metering valves utilized to control pressure in the pressure control mechanism may not have sufficient capacity to maintain properly the reference or control pressure due to the large and desirably rapid change in displacement in the outflow valve pressure chamber which, as stated previously, is normally connected to the control pressure chamber of pressure control mechanism, and the outflow valve may either overtravel or have an undesirable lag. Such overtravel or lag is particularly noticeable where the control setting mechanism is remotely positioned with respect to the outflow valves.

It is an object of the present invention to provide pressure regulating mechanism that will permit the use of pressure control setting mechanism containing small metering valves to control an outflow valve capable of handling a large flow of air.

Another object of the invention is to provide mechanism of this character wherein the large capacity outflow valve will respond rapidly to pressure changes.

A further object of the invention is to provide a pneumatic relay means embodied in an outflow valve whereby the foregoing objects will be effected.

A still further object of the invention is to provide a pneumatic relay means having a single valve for controlling the inflow and/or outflow of air from the outflow valve operating pressure chamber.

A further object of the invention is to provide pressure regulating mechanism of this character including power actuated means for effecting positive opening or closing of the outflow valve.

A still further object of the invention is to provide pressure regulating mechanism of this character including manual means to quickly close the outflow valve in an emergency.

A still further object of the invention is to provide pressure regulating mechanism of this character having means for controlling the operation of an unbalanced, or only partially balanced, valve, such as a butterfly valve, but which may also be used for controlling the operation of a balanced valve.

Other and further objects of the invention will become apparent from the following description of a preferred form of the invention, and from the accompanying drawing in which is shown a schematic sketch of an enclosure pressure regulating mechanism incorporating the features of the invention.

Referring now to the drawing, there is shown an enclosure 10, such as an aircraft cabin, which is supplied with air under pressure by means of a blower or supercharger 11 operated by any suitable source of power, not shown. The air pressure within the enclosure is maintained in accordance with a predetermined schedule by means including an outflow valve and actuating mechanism, indicated generally at 12, which is adapted to control the outflow of enclosure air through an outlet 13 in a wall 14 of the enclosure 10.

Communicating with the outlet 13 is a conduit 15 defining an air passage 16 from the enclosure to the ambient atmosphere. The passage 16 is controlled by a butterfly valve member 17 mounted on a valve shaft 18 which extends substantially diametrically of the passage 16 and is suitably supported in bearings, not shown.

The valve shaft 18 is rigidly connected at its lower end to a shaft 19 which is rotatably received in a boss 20 located on the outer wall of the conduit 15. The shaft 19 extends from and forms a part of a disc 21 that is provided with a plurality of recesses 22 for reception of pins 23 secured to a cable quadrant 24 rotatably mounted on the shaft 19. A spring 25 normally holds the pins 23 of the quadrant 24 engaged in the recesses 22 of the disc 21, so that the quadrant and disc are normally operatively connected but may be disengaged in the manner hereinafter described.

The valve member 17 is urged in the closing direction by a spring 26 fastened at one end to an arm 27 depending from the disc 21 and at the other end to a fixed support 28.

Further mechanism, in addition to the spring 26, for actuating the valve member 17 includes a pneumatic actuator section, indicated generally at 29, formed of a cup-shaped section 30 and a cup-shaped section 31 secured together with their rim portions facing each other, by any suitable means such as screws, not shown, and clamping therebetween the outer periphery of an annular, flexible diaphragm 32. The inner periphery of the diaphragm 32 is clamped between a plate 33 and a ring-shaped member 34 by means such as rivets 35 so that the diaphragm 32 and the plate 33 form a differential pressure-responsive movable wall which divides the actuator section 29 into an operating pressure chamber 36 and a cabin pressure chamber 37. A cable 38, operatively attached at one end to a boss 39 formed integral with the plate 33, extends around a pulley 40 and is fastened at its other end in a peripheral groove 41 of the quadrant 24 so that movement of the plate 33 causes corresponding rotational movement of the quadrant 24 and the valve member 17.

An opening 42 is provided in the cup-shaped section 31 to allow unrestricted entry of enclosure air into the cabin pressure chamber 37 so that the pressure of the air in chamber 37 is at all times the same as the pressure of the air in the enclosure 10.

The mechanism for controlling the pressure of the air in the operating pressure chamber 36 includes a pneumatic booster relay mechanism, indicated generally at 43, formed of a housing section 44 and a housing section 45 secured together with their rim portions facing each other, by any suitable means such as screws, not shown. The rim portions of the sections 44 and 45 marginally clamp therebetween a flexible diaphragm 46 so as to form a chamber 47 and a chamber 48 on opposite sides of the diaphragm 46.

The chamber 47 has a connection 49 with a control pressure chamber 50 of a pressure control setting mechanism 51 so that the pressure of the air in chamber 47 is substantially the same as the pressure of the air in the control pressure chamber 50 of the control setting mechanism 51. The pressure in the control pressure chamber 50 is controlled by suitable pressure-responsive means in accordance with a preselected schedule. One type of mechanism for controlling the pressure in chamber 50 is disclosed in U. S. Patent No. 2,669,175, dated February 16, 1954. One or more of the various units disclosed therein for controlling the pressure within the control chamber thereof may be used for controlling the pressure in chamber 50. It is to be understood, of course, that various other means may be used for controlling the pressure in chamber 50, that referenced being merely one example. It is to be noted that the control pressure chamber 50 has an inlet bleed 52 from a region of higher pressure, such as the enclosure, and a connection 53 with a region of lower pressure, such as the ambient atmosphere. The outlet connection 53 is controlled by the pressure control means which controls the pressure in chamber 50.

In the chamber 47, a calibration spring 54 is disposed between a reinforcing plate 55 and a spring retainer 56 adjustably secured to a screw 57 which extends outwardly of the cup-shaped section 44. A nut 58 secures the screw 57 in adjusted position.

Opposite the reinforcing plate 55 is a reinforcing plate 59, a central region of the diaphragm 46 and the reinforcing plates 55 and 59 being secured together by rivets or any other suitable and well-known means, not shown.

An opening 60 filled with filtering material 61 is provided in the housing section 45 to allow unrestricted entry of enclosure air into the chamber 48 so that the pressure of the air in chamber 48 is, at all times, the same as the pressure of the air in the enclosure.

A relay metering valve 62 having a valve seat 63 secured in a boss 64 formed in the housing section 45 is provided with an axial bore 65 that has a port 66 communicating with enclosure pressure in the chamber 48, and a port 67 communicating with a region of lower pressure such as a vacuum source or, as shown in the drawing, the conduit 15 on the atmospheric side of the butterfly valve member 17. The axial bore 65 in the valve seat 63 has an enlarged central portion 68 in which is located a reciprocating valve member 69. A valve stem 70 extends from the valve member 69 into the chamber 48 and is held in contact with the reinforcing plate 59 of the diaphragm 46 by a spring 71 disposed between the boss 64 and a spring retainer 72 secured to the stem 70. The enlarged central portion 68 and the operating pressure chamber 36 are joined by a conduit 73 so that the chamber 36 is ported to enclosure pressure in chamber 48 and to ambient atmosphere in the conduit 15.

Electromechanical means are provided to override the pneumatic control and comprise an arm 74 on the quadrant 24 which is actuated by a cam 75 secured on the output shaft of an electric torque actuator 76 to effect movement of the butterfly valve member 17. Limit switches 77 and 78, actuated by the disc 21 when the butterfly valve member 17 reaches fully open or fully closed position, are provided to control the movement of the actuator 76.

A spring-loaded pressure relief valve 79 is installed on the chamber 36 to limit pressure differentials across diaphragm 32 when the actuator 76 is utilized to override the pneumatic system and to forcibly close the outflow valve member 17.

Manual means are provided to close the butterfly valve member 17 in an emergency, and these include a cable 80 attached at 81 to a lever 82 having a pivot 83 and an eccentric 84 that functions to disengage the quadrant 24 from the disc 21, permitting the valve member 17 to close, in the manner hereinafter described.

*Operation of the mechanism*

When the airplane is on the ground, a circuit is completed between the landing gear switch (not shown) and the torque actuator 76 to energize the actuator and rotate the cam 75 in a direction to effect positive opening of the valve member 17. As the cam rotates, the surface of the cam actuates the arm 74 to rotate the quadrant 24 and the connected disc 21 until the valve member 17 reaches the fully open position. When the valve member 17 reaches the fully open position, the limit switch 77 is actuated by the disc 21 and the actuator is de-energized. The valve member 17 is thus held in open position and the enclosure pressure is maintained substantially at ambient pressure.

Prior to take-off, ambient atmospheric pressure exists in the control pressure chamber 50, and this pressure is transmitted through the connection 49 to the chamber 47 of the booster relay mechanism 43. Since the pressure of the ambient air in chamber 47 is lower than the pressure of the enclosure air in the chamber 48, the pressure differential acting across the diaphragm 46 will tend to move the diaphragm 46 upwardly and position the valve member 69 to close the port 66 to enclosure pressure, and to fully open port 67 to atmospheric pressure to permit unrestricted flow of ambient atmosphere into the operating chamber 36 through the port 67 and the conduit 73. The enclosure pressure in chamber 37, acting on the lower face of the diaphragm 32 and the plate 33 in opposition to the ambient pressure in chamber 36, creates a pressure differential across the said diaphragm and plate which tends to position the butterfly valve member 17 in the open position.

When the aircraft takes off, the landing gear switch repositions itself, causing the actuator 76 to rotate in the opposite direction until it centers itself and the surface of the cam no longer contacts the arm 74; and the system operation then becomes fully pneumatic. The transfer from electromechanical to pneumatic operation does not produce any noticeable cabin pressure changes since the valve member 17, which was held in the open position by the electromechanical control, remains in the wide-open position when the system operation becomes fully pneumatic.

As the airplane starts to climb with the valve member 17 in the open position, a drop occurs in the ambient atmospheric pressure which is transmitted through the conduit 15 to the enclosure 10 and the chamber 48. The pressure in the control chamber 47 will reduce at a rate determined by the control setting mechanism 51 and, should the enclosure pressure in chamber 48 drop below the pressure existing in chamber 47, a pressure differential will be set up across the diaphragm 46 that will cause the diaphragm and the valve member 69 to move in a downward direction to simultaneously partially close the port 67 to ambient atmosphere and partially open the port 66 to enclosure pressure and thus increase the pressure in the operating chamber 36. The resultant change in pressure differential across the diaphragm 32 and plate 33 will move the said diaphragm and plate downwardly and the force of the spring 26 will actuate the butterfly valve member 17 toward a closed position to modulate the flow of enclosure air to atmosphere to maintain the pressure in chamber 48, and consequently in enclosure 10, at the level of the pressure in chamber 47.

Changes in enclosure pressure, which cause the enclosure pressure in chamber 48 to vary from the controlled reference pressure in chamber 47, will create a change in pressure differential across the relay diaphragm 46 and the operating diaphragm 32 and plate 33 simultaneously to reposition the butterfly valve member 17 and compensate for the pressure change. If, for example, the enclosure pressure should become greater than the reference pressure existing in chamber 47, the increased pressure acting on the underside of the diaphragm 32 and plate 33 will move the said diaphragm and plate upwardly to move the valve member 17 toward the open position to modulate the flow of enclosure air to atmosphere and bring the pressure in the enclosure down to the level of the pressure in chamber 47. Simultaneously, the increased pressure acting on the underside of the diaphragm 46 will move the diaphragm, and the relay valve member 69, in an upward direction to correct the pressure in the operating chamber 36. Conversely, should the enclosure pressure drop below the reference pressure existing in chamber 47, there will be a resultant change in the pressure differential across the diaphragm 32 and plate 33 which will allow the said diaphragm and plate to be urged downwardly by the spring 26 to move the butterfly valve member 17 toward the closed position to modulate the flow of enclosure air to atmosphere and bring the pressure in chamber 48 up to the level of the pressure in chamber 47. Simultaneously, the diaphragm 46, and the valve member 69, will be moved in a downward direction to correct the pressure in the operating chamber 36.

Changes in the control pressure in chamber 50 of the pressure control setting mechanism 51, such as changes resulting from adjustments made to change the desired pressure schedule in the enclosure, are transmitted to the chamber 47, and effect a change in pressure differential across the diaphragm 46. This change in differential moves the diaphragm 46 to reposition the valve member 69 to change the operating pressure in chamber 36. The resultant change in pressure differential across the diaphragm 32 and plate 33 will cause the butterfly valve member 17 to reposition to modulate the flow of enclosure air to atmosphere to maintain the pressure in chamber 48, and consequently in enclosure 10, at the level of the pressure in chamber 47.

When the airplane lands, the outflow valve member 17 will be in the open position and the pressure of the air in the enclosure 10 and chamber 48 will be approximately equal to existing atmospheric pressure. Thus, there will be no appreciable effect on the enclosure pressure when the landing gear relay is energized and the actuator 76 functions to open the outflow valve member 17.

To manually close the butterfly valve member 17 in an emergency, the cable 80 is pulled to the left, as shown in the drawing, rotating the lever 82 about the pivot 83 so that the eccentric 84 bears against the arm 74, thus lifting the quadrant 24 until the pins 23 of the quadrant are removed from the recesses 22 of the disc 21. This disengages the quadrant 24 from the disc 21 and disconnects the actuator diaphragm 32 and plate 33 from the shaft 19. The force of the spring 26 acting on the disc 21 then closes the butterfly valve member 17. The valve member 17 cannot be reopened pneumatically or electrically until the lever 82 is returned to normal position and until the quadrant is rotated so that the pins 23 are received in recesses 22, the quadrant and disc being urged into engagement by the spring 25.

What is claimed is:

1. In pressure control mechanism for controlling the pressure in an enclosure: means forming a passage for the outflow of air from the enclosure; valve means for controlling the flow of air through said passage means, said valve means including an outflow valve member; a pressure sensitive valve actuating element subjected to enclosure pressure on one side; walls defining a chamber for an operating pressure, the other side of said pressure sensitive element being subjected to the pressure in said chamber; relay means for controlling said operating pressure including a pressure responsive member subjected on one side to enclosure pressure and on the opposite side to a control pressure; control means for controlling said control pressure in accordance with a predetermined schedule; yielding means urging the outflow valve member in the closing direction; releasable means operatively engaging said valve means; pressure means for holding said releasable means and said valve means in engagement; connecting means having one end connected to the pressure sensitive valve actuating element and the other end connected to the releasable means for effecting opening movement of the valve member; and means for disengaging the releasable means from the valve means to permit said yielding means to close said outflow valve member.

2. In pressure control mechanism for controlling the pressure in an enclosure: means forming a passage for the outflow of air from the enclosure; valve means for controlling the flow of air through said passage means, said valve means including an outflow valve member; a pressure sensitive valve actuating element subjected to enclosure pressure on one side; an operating pressure chamber having means connecting it to a source of higher pressures and to a region of lower pressure, the other side of said pressure sensitive element being subjected to the pressure in said chamber; relay means including a single valve in said operating pressure chamber connection for controlling admission of pressure to and release of pressure from said operating pressure chamber; a pressure responsive member for controlling said single valve and thereby controlling the pressure in said operating pressure chamber, said pressure responsive member being subjected on one side to enclosure pressure and on the opposite side to a control pressure; control means for controlling said control pressure in accordance with a predetermined schedule; yielding means urging the outflow valve member in the closing direction; releasable means operatively engaging said valve means; pressure means for holding said releasable means and said valve means in engagement; connecting means having one end connected to the pressure sensitive valve actuating element and the other end connected to the releasable means for effecting opening movement of the valve member; and means for disengaging the releasable means from said valve means to permit said yielding means to close said outflow valve member.

3. The invention defined by claim 2, wherein said source of higher pressure is the enclosure and said region of lower pressure is the external atmosphere.

4. In pressure control mechanism for controlling the pressure in an enclosure: means forming a passage for the outflow of air from the enclosure; an oscillatable valve shaft in said passage; means secured to said oscillatable valve shaft including an outflow valve member for controlling the flow of air through said passage; yielding means attached to said oscillatable valve shaft for urging the outflow valve member in the closing direction; releasable means operatively engaging said oscillatable shaft means; pressure means for normally holding said releasable means and said oscillatable valve shaft in engagement; means for disengaging said releasable means from said oscillatable valve shaft to permit said yielding means to close said outflow valve member; a pressure sensitive valve actuating element subjected to enclosure pressure on one side; connecting means having one end connected to said pressure sensitive valve actuating element and the other end attached to said releasable means for effecting opening movement of said outflow valve member; walls defining a chamber for an operating pressure, the other side of said pressure sensitive element being subjected to the pressure in said chamber; relay means for controlling said operating pressure including a pressure responsive member subjected on one side to a control pressure; and a pressure control setting mechanism for controlling said control pressure in accordance with a predetermined schedule.

References Cited in the file of this patent

UNITED STATES PATENTS

| | | |
|---|---|---|
| 2,424,764 | Marshall | July 29, 1947 |
| 2,510,976 | Herrala et al. | June 13, 1950 |
| 2,578,026 | Taylor | Dec. 11, 1951 |
| 2,578,773 | Arthur | Dec. 18, 1951 |
| 2,585,295 | Baak | Feb. 12, 1952 |
| 2,610,564 | Cooper et al. | Sept. 16, 1952 |